B. K. HENDRICKS.
HITCH STRAP HOLDER.
APPLICATION FILED SEPT. 23, 1908.
916,311.
Patented Mar. 23, 1909.
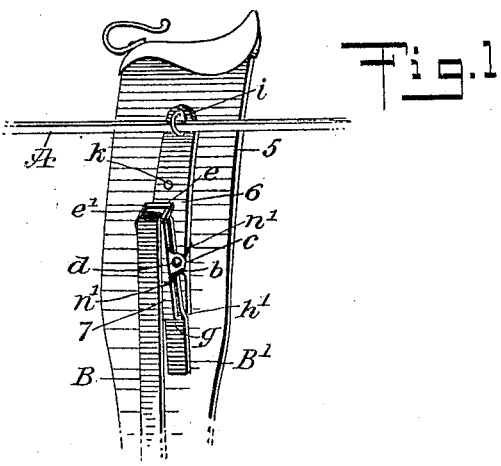
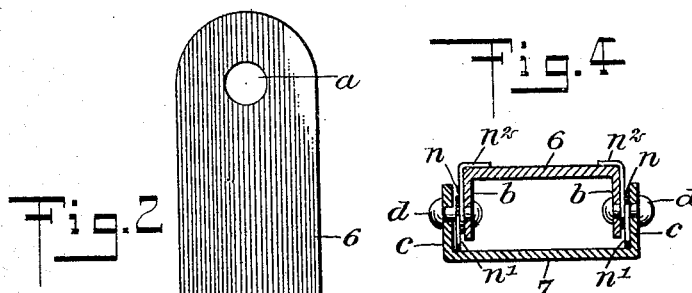
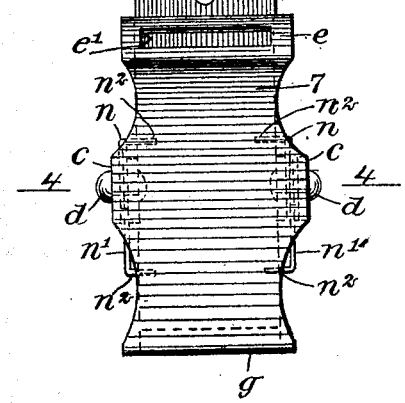
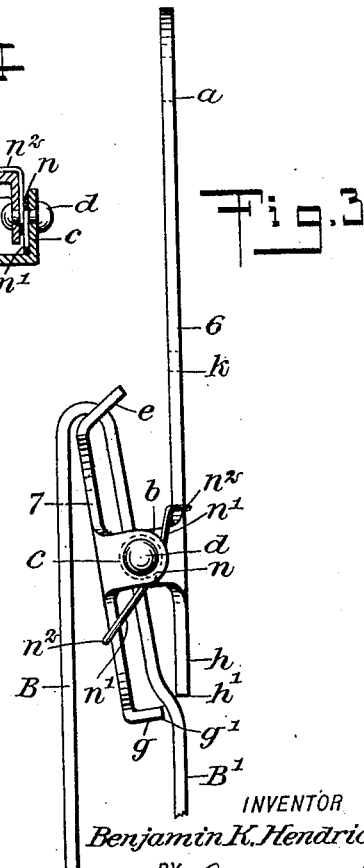
WITNESSES
INVENTOR
Benjamin K. Hendricks
BY
ATTORNEYS

UNITED STATES PATENT OFFICE.

BENJAMIN KINNEY HENDRICKS, OF MENDON, ILLINOIS.

HITCH-STRAP HOLDER.

No. 916,311.  Specification of Letters Patent.  Patented March 23, 1909.

Application filed September 23, 1908. Serial No. 454,329.

*To all whom it may concern:*

Be it known that I, BENJAMIN KINNEY HENDRICKS, a citizen of the United States, and a resident of Mendon, in the county of Adams and State of Illinois, have invented a new and Improved Hitch-Strap Holder, of which the following is a full, clear, and exact description.

The purpose of this invention is to provide a novel, simple device, which may be readily secured upon a saddle, or on the driving harness for a horse, and afford convenient reliable means for quickly securing the free end portion of a hitch strap or halter in doubled condition on such a support, when said strap is not in use, and thus dispense with the need of tying the hitch strap in or upon a terret ring or a like projection from the harness, when the animal has been released from a hitching post.

The invention consists in the novel construction and combination of parts, as is hereinafter described and defined in the appended claims.

Reference is to be had to the accompanying drawings forming a part of this specification, in which similar characters of reference indicate corresponding parts in all the views.

Figure 1 is a side view of a harness back strap, a perspective view of the improvement mounted thereon, and of a portion of a hitch strap engaged with and supported by the improved holder; Fig. 2 is a detached enlarged front view of the improved hitch strap holder; Fig. 3 is an edge view of the device, and of a hitch strap portion that is engaged with the holder for its support; and Fig. 4 is a transverse sectional view of the improvement, substantially on the line 4—4 in Fig. 2.

In the drawings, the improvement is shown as secured upon the back strap 5 of driving harness, to illustrate its application for service, and comprises the following details: A hanger plate 6 constitutes the attaching means for the device, and consists of a flat bar of any suitable metal, preferably having parallel side edges, and a width and length that adapt it for effective service. The upper end of the hanger plate may be rounded as shown, and near said end a central perforation $a$ is formed. At a proper distance from the lower end of the hanger plate 6, two similar ears $b$, $b$, are formed on the side edges thereof, said ears that are oppositely positioned having opposite central perforations therein. A clamping plate 7 is a complementary detail of the holder, and as shown, consists of a flat metal bar, having two ears $c$, $c$, formed oppositely on its side edges near the longitudinal center thereof, said ears being so spaced apart that they may be loosely engaged with the outer surfaces of the ears $b$, $b$, and are centrally perforated to mate the holes in the ears $b$. The ears $b$, $b$ and $c$, $c$, that lap upon each other in pairs, are loosely secured upon each other by pivots $d$, $d$ that respectively pass through the perforations therein, as is indicated in Fig. 4. Upon the upper end of the clamping plate 7, a strap carrier $e$ is formed, the material composing said carrier being bent at an angle toward the hanger plate 6, and in the same a transverse slot $e'$ is formed. At the lower end of the clamping plate 7, a tongue $g$ is formed, by bending or otherwise projecting the material thereof toward the lower end $h$ of the hanger plate.

As shown in Fig. 3, the straight transverse edge defining the lower end of the hanger plate 6, and a like edge on the tongue $g$, are disposed near each other, so that angular corners $h'$ and $g'$ thereon will be opposed to each other and will nearly have contact when the tongue is rocked toward the hanger plate. In the present example, that illustrates the attachment of the hitch strap holder upon the side of a back strap or harness saddle piece 5, a terret post thereon is utilized as a means for attaching the hanger plate 6 thereupon. To this end, a post having the usual ring $i$ integral therewith, for the support of a driving rein A, is detached temporarily by unscrewing it from a nut embedded in the back strap, and then passed through the perforation $a$ in the hanger plate 6. The terret post and ring thereon are now replaced on the back strap, thus securing the hanger plate 6 thereon, pendent from said terret post and ring. There may be another perforation $k$ formed in the hanger plate 6, for the reception of a rivet or screw, not shown, this perforation becoming available when the hanger plate is to be secured lower down on a back strap, or on a harness collar, or a saddle, as may be found desirable in the general use of the improvement.

The improved strap holder that has been described may be used as constructed, by passing the hitch strap such as B, first down through the slot of the carrier $e$, from the outer side thereof, and between the ears $b$, $b$, thence inserting the end portion of said hitch strap between the angular corners $h'$ and $g'$, respectively on the tongue $g$ and lower end $h$ of the hanger plate 6. It will be seen, that as the weight of the looped portion of the hitch strap B is disposed pendent from the carrier $e$, outside of the clamping plate 7, the gravity of said pendent portion will rock the tongue $g$ into engagement with the end portion $B'$ of the hitching strap B, and cause said strap end to be clamped between the angular corners $h'$, $g'$, thus detachably securing the strap upon the holder.

As shown in the drawings, a means coöperating with the gravity of the hitch strap is provided, for securing its end on the holder device, this supplementary detail consisting of two similar springs, preferably bent from wire strands, each constructed as follows: Near the center of length, a spring coil $n$ is formed on a wire strand, and upon two oppositely extended portions $n'$ of said strand an arm $n^6$ is bent on each parallel with each other. The coil $n$ of each completed spring is mounted upon a rivet or screw $d$, that serves as pivot between two of the lapped ears $b$, $c$, the spring coils occupying spaces between respective pairs of ears, and the arms $n^2$ hooking upon the hanger plate 6 and clamping plate 7, respectively. The springs that have been described are put under tension sufficient to normally press the tongue $g$ into engagement with the lower end of the hanger plate 6.

In use of the device having the springs connected therewith, the hitch strap at its free end $B'$ is passed through the carrier $e$, thence down between the ears $b$, $b$, and then between the ends of the tongue $g$ and hanger plate 6, pressure on the upper end of the clamping plate 7 causing the lower end thereof to rock outward against stress of the springs, which will permit the free downward insertion of the end $B'$ of the hitch strap between said tongue and hanger plate. Obviously, upon relaxing pressure upon the upper end of the clamping plate 7, the tension of the spring coils $n$ will press the tongue $g$ forcibly toward the inserted strap end $B'$, and the latter will be clamped between the strap corners $h'$, $g'$, thus securing the hitch strap end, which may be readily released by pressing the upper end of the clamping plate 7 toward the hanger plate and simultaneously pulling the strap B out of the carrier $e$.

It will be understood that the device is made in sizes to correspond with the thickness and width of a hitch strap or halter, and, furthermore, that it may be manufactured of any preferred metal, and finished by any preferred means.

As hereinbefore mentioned, the improved hitch strap holder may be secured upon a harness collar, a back strap thereof, or upon a saddle, and serve as a convenient and reliable means for releasably holding a hitch strap, dispensing with the usual inconvenience of having to tie the strap to a terret ring.

Having thus described my invention, I claim as new and desire to secure by Letters Patent:

1. A hitch strap holder, comprising a supporting member, and a clamping member pivoted intermediate of its ends to the supporting member and having at one end a slot through which a strap is adapted to be passed and at its other end, a laterally extending projection, between which and the supporting member, the strap is adapted to be clamped.

2. The combination with a hanger plate, having a pair of opposite ears thereon, of a clamping plate having mating ears lapped and pivoted upon the ears on the hanger plate, an angularly bent carrier on the upper end of the clamping plate, and a laterally trending tongue on the lower end of said clamping plate.

3. The combination with a hanger plate having a pair of opposite ears on side edges thereof near the lower end, a clamping plate having mating ears, pivots connecting each pair of ears that are lapped together, a spring coil on each pivot and having arms that press upon the clamping plate and hanger plate, an angularly bent carrier formed on the upper end of the clamping plate, having a transverse slot for the reception of a hitch strap, and a laterally trending tongue on the lower end of said clamping plate that impinges upon the hitch strap and clamps it between an end thereof and a corresponding end of the hanger plate.

In testimony whereof I have signed my name to this specification in the presence of two subscribing witnesses.

BENJAMIN KINNEY HENDRICKS.

Witnesses:
OTHO N. GAY,
C. F. BURNHAM.